(12) United States Patent
Bouet et al.

(10) Patent No.: US 8,380,063 B2
(45) Date of Patent: Feb. 19, 2013

(54) SWITCHED OPTICAL FIBRE NETWORK FOR AIRPLANE SEATS

(75) Inventors: Loïc Bouet, Levet (FR); Benoit Guichard, Meunet-Planches (FR); Jerome Marquet, Monts (FR)

(73) Assignee: SiT (FR)

( * ) Notice: Subject to any disclaimer, the term of this patent is extended or adjusted under 35 U.S.C. 154(b) by 665 days.

(21) Appl. No.: 12/521,832

(22) PCT Filed: Jan. 7, 2008

(86) PCT No.: PCT/FR2008/050018
§ 371 (c)(1),
(2), (4) Date: Nov. 20, 2009

(87) PCT Pub. No.: WO2008/099098
PCT Pub. Date: Aug. 21, 2008

(65) Prior Publication Data
US 2010/0098418 A1    Apr. 22, 2010

(30) Foreign Application Priority Data
Jan. 5, 2007 (FR) ...................... 07 52542

(51) Int. Cl.
*H04B 10/20* (2006.01)
*H04J 14/02* (2006.01)

(52) U.S. Cl. ................ 398/58; 398/60; 398/82

(58) Field of Classification Search ............... 398/58, 398/60, 66, 67, 82, 83
See application file for complete search history.

(56) References Cited

U.S. PATENT DOCUMENTS

| | | | | |
|---|---|---|---|---|
| 4,948,218 | A * | 8/1990 | Kobayashi et al. | 398/141 |
| 5,274,673 | A * | 12/1993 | Kaharu et al. | 375/282 |
| 2001/0021289 | A1* | 9/2001 | Nir | 385/17 |
| 2004/0235469 | A1* | 11/2004 | Krug | 455/431 |
| 2006/0142002 | A1 | 6/2006 | Funderburk | |

FOREIGN PATENT DOCUMENTS
GB   2 347 806   9/2000

OTHER PUBLICATIONS
International Search Report dated Nov. 7, 2008.

* cited by examiner

*Primary Examiner* — Dalzid Singh
(74) *Attorney, Agent, or Firm* — Dean W. Russell; Kilpatrick Townsend & Stockton LLP

(57) ABSTRACT

The invention relates to a network of switched optical fiber for airplane seats. The network connects the screens of the seats to each other and to a server via an optical fiber. The network includes optical switches of the MEMS type including mirrors, said switches being provided perpendicular to each seat. Each switch delivers the light beam in the optical fiber to the screen with which it is connected and re-amplifies it in the optical fiber when it is powered, while the switch directly delivers the light beam to the following seat when it is not powered.

10 Claims, 5 Drawing Sheets

SWITCHED OPTICAL FIBRE NETWORK FOR AIRPLANE SEATS

This application claims priority of PCT International Application No. PCT/FR2008/050018 filed on Jan. 7, 2008. The contents of which are incorporated herein by reference.

FIELD OF THE INVENTION

The present invention pertains to a switched optical fiber network for airplane seats. The object of the present invention is especially to secure such a network in case of failure of one of its switching elements.

BACKGROUND

Generally, in an airplane, screens are integrated in each seat as much for the broadcasting of entertainment programs (music, films, video games, etc.) as for the transmission of safety messages (buckling of belts, use of electronic devices, etc.). These screens are connected within a network to a central computer or server.

Thus, FIG. 1 shows a prior-art network 1, in which screens 2.1-2.N of seats 3.1-3.N are connected to a server 4. These screens 2.1-2.N are connected to the server 4 via network switches 4.1-4.3 or switches. These switches 4.1-4.3 transmit the information received on one of their ports to the screen to which it is intended. The cables 5, which ensure the links between the switches 4.1-4.3 and the server 3, are copper cables in which signals circulate that are generally the standard of the Ethernet bus.

This type of network has the drawback of being heavy since copper is a high-density metal. One solution consists of replacing it with aluminum, whose density is 3.3 times lighter. However, since aluminum is not used very widely—at least for cables of small sections, it poses difficulties in terms of connecting to connectors, as well as in terms of contact quality and risk of corrosion.

In addition, this type of network produces a relatively intense electromagnetic field, which makes it necessary to take a lot of precautions as much for preventing interference with electronic equipment in the vicinity as for being parasitized by the equipment of the airplane.

Moreover, as the network switches 4.1-4.3 do need a power supply, the risks of failure can never be entirely eliminated. Now, if one of the switches 4.1-4.3 fails, all the screens 2.1-2.N of the seats located downstream are inoperative. Not only are passengers deprived of their entertainment programs, but, more importantly, the safety instructions can no longer be displayed on a significant number of seats.

The above-mentioned drawbacks disappear if the copper cable 5 is replaced with an optical fiber cable 9 because it becomes possible to use, perpendicular to each seat, entirely passive optical couplers 10.1-10.3, as shown in FIG. 2.

These optical couplers 10.1-10.3 replace the previous switches. These optical couplers 10.1-10.3 are light shunters which do not comprise any component capable of failing and do not require any electric power supply. The weight of the fiber by itself is negligible, and the light beam not only does not generate parasitics, but is not susceptible to interfering electromagnetic fields.

Such a network is called a PON network (for Passive Optical Network in English). In this network, the transceivers 11.1-11.3 and 12 (transceiver in English) are positioned between the communicating elements (screens or server) and the couplers for converting the electric signals into light signals and vice versa.

However, each coupler 10.1-10.3 introduces an attenuation of the signal which limits the number of seats connected to a single fiber. In fact, a passive optical network can hardly serve more than 12 seats, which makes it necessary either to multiply the number of optical fibers or to re-amplify the light signal every 12 couplers, in which case, we again find the risks of failures of the Ethernet bus affecting copper cables.

SUMMARY OF THE INVENTION

The present invention proposes to overcome these above-mentioned drawbacks of the optical network.

For this purpose, in the present invention the simple couplers are replaced with active optical switches of the type MEMS (for Micro-Electro-Mechanical Systems in English), which comprise a mobile micro-mirror. The switch can thus orient the light signal circulating in the optical fiber by two directions. One is stable in the absence of control (inactive position), the other is temporary and is only obtained when voltage is applied to the switch.

In the temporary position, the switch delivers the light beam to the screen and re-amplifies it in the optical fiber, while in the inactive position, the switch delivers this light beam directly to the next seat.

Contrary to the above-mentioned simple coupler, the switch is an active device. However, it is called "positive safety" because in case of failure of the control electronics, or in case of a loss of power supply, the switch returns, of course, to an inactive position.

Thus, not only do the downstream seats continue to receive the safety instructions and the entertainment programs in case of malfunction, but, because of the local re-amplifications, the number of seats capable of being served is theoretically unlimited.

The optical network according to the present invention is therefore suitable for new high-capacity airplanes.

Therefore, the present invention pertains to a switched optical fiber network for airplane seats, this network comprising screens connected to each other via an optical fiber, a signal light circulating in this optical fiber to these screens,
  this network additionally comprising an upstream switching box and a downstream switching box connected in series on the optical fiber to each other, the upstream switching box being positioned upstream of the downstream switching box,
  at least one screen being connected to each switching box, characterized in that
  the upstream switching box comprises means for allowing the light signal to pass to the downstream box when the said upstream box is not live,
  the upstream switching box comprising means for deviating the light signal to the screen to which it is connected, and means for amplifying the light signal and sending it to the downstream switching box when the said upstream box is live.

In one embodiment, the upstream switching box comprises an optical switch, this optical switch comprising a fixed mirror and two mobile mirrors rotating about an axis. These mirrors are positioned in such a way that they reflect the light signal to the downstream switching box when the switch is not live, the switch thus being in an inactive position. These mirrors are positioned in such a way that they reflect the light signal to the screen and to the downstream switch when the optical switch is live, the optical switch thus being in an active position.

In one embodiment, each mobile mirror of the optical switch comprises a first and a second control electrode. The first electrode is positioned on one end of the mobile mirror and the second electrode is positioned on the fixed part of the switch. The optical switch is in the inactive position when the two electrodes are not live, while it is in the active position when the two electrodes are live.

In one embodiment, the upstream switching box additionally comprises a transceiver positioned between the screen and the optical switch of the upstream box. This transceiver ensures the conversion of the light signal sent over the optical fibers into an electric signal sent to the screen and vice versa, as well as the amplification of the light signal sent to the downstream switching box.

In one embodiment, an Ethernet type network switch is connected between the optical switch of a switching box and the screen to which it is connected, other screens being connected to this network switch.

In one embodiment, a server is connected to the screens via the optical fiber, this server sending data, such as instructional data, to the screens of the network.

BRIEF DESCRIPTION OF THE DRAWINGS

In one embodiment, the optical fiber is bidirectional.

The present invention shall be better understood after reading the following description and viewing the figures that accompany it. These are given as a way of illustrating but not limiting the present invention, in which.

DETAILED DESCRIPTION

Identical components retain the same reference from one figure to the next.

Figure 1:
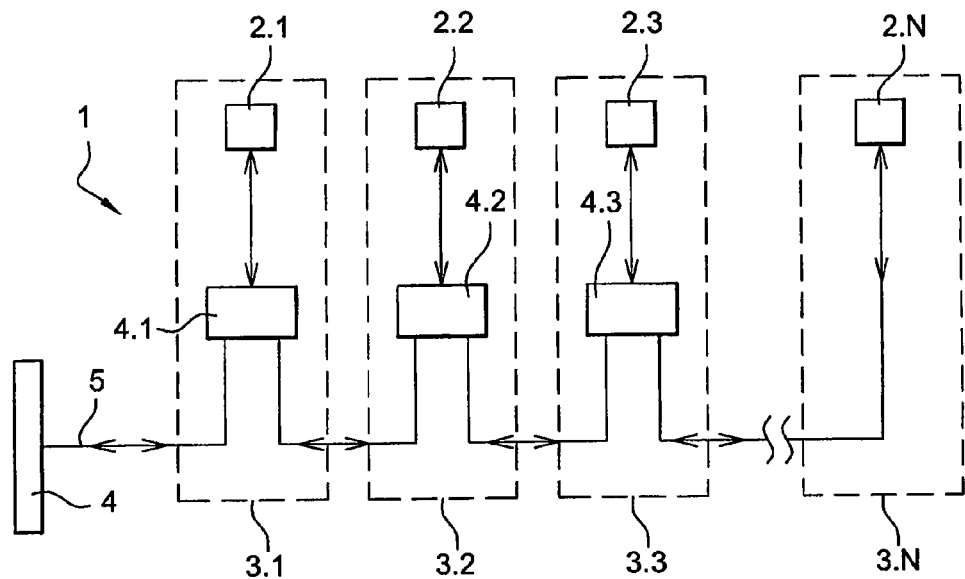
FIG. 1 (already described) shows a schematic representation of a network comprising copper cables according to the state of the art.
Figure 2:
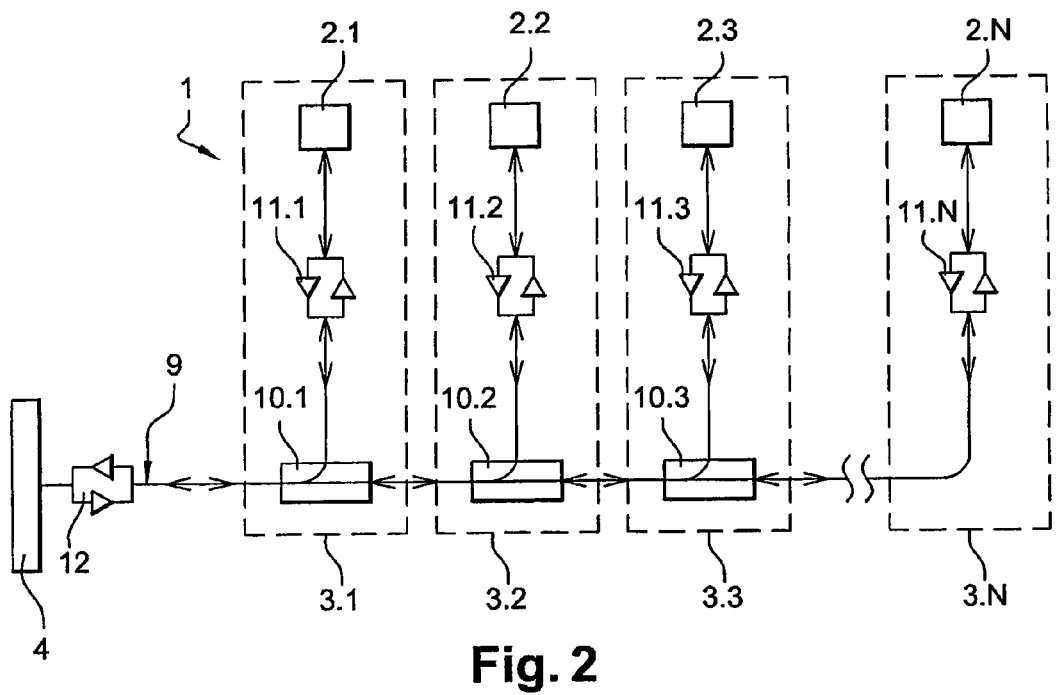
FIG. 2 (already described) shows a schematic representation of an optical fiber network according to the state of the art.
Figure 3:
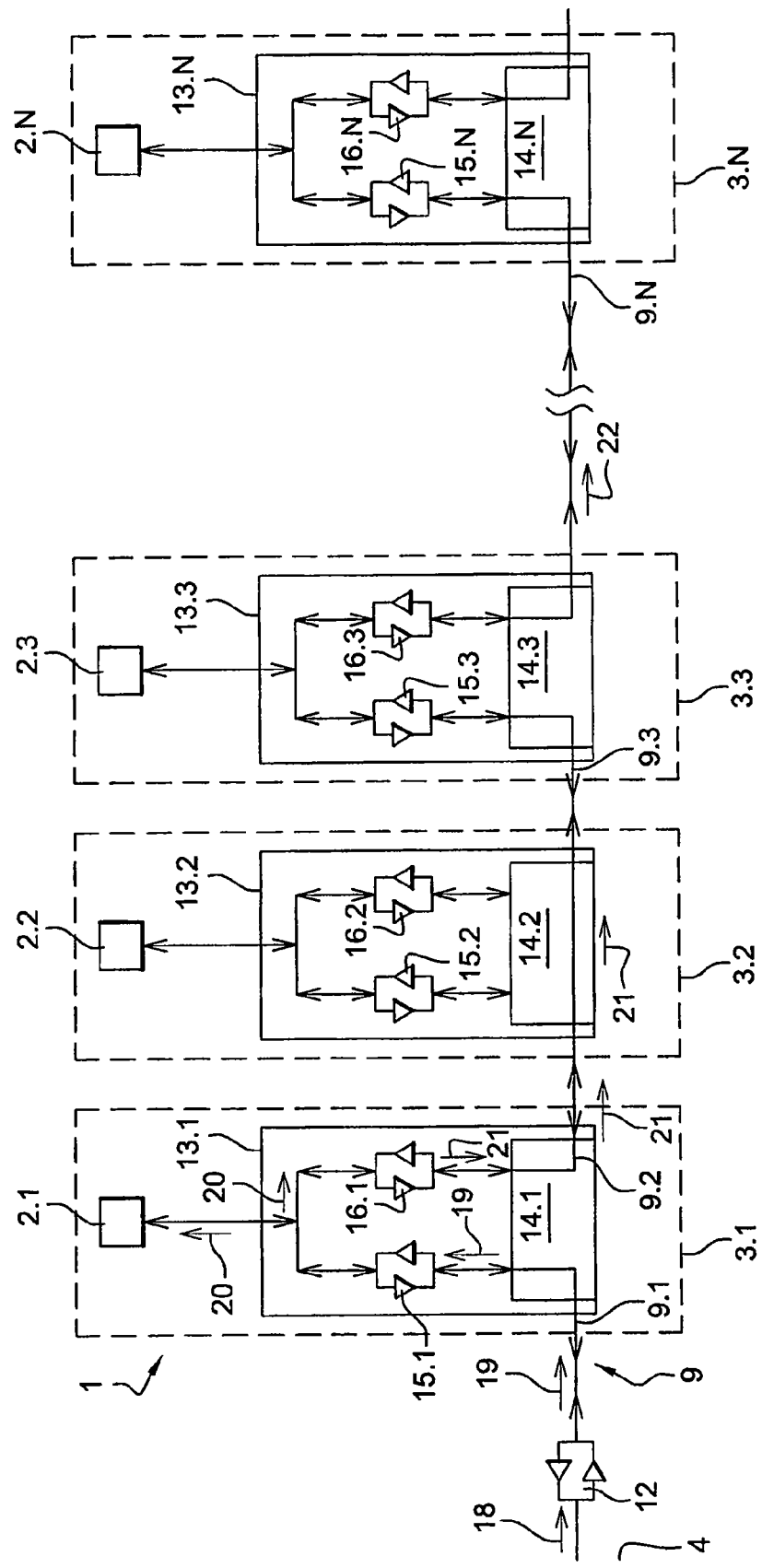
FIG. 3 shows a schematic representation of a switched optical fiber network according to the present invention.

FIG. 3 shows a switched optical fiber network 1 for airplane seats 3.1-3.N. This network 1 comprises screens 2.1-2.N connected to each other and to a server 4 via an optical fiber 9. These screens 2.1-2.N each comprise a computer (not shown) provided with a network card which enables them to exchange data on an Ethernet type network.

These screens 2.1-2.N are connected to the optical fiber 9 via switching boxes 13.1-13.N connected in series to each other. Each switching box 13.1-13.N comprises an optical switch 14.1-14.N and two transceivers 15.1-15.N and 16.1-16.N (transceivers in English) connected, on the one hand, to the optical switch 14.1-14.N and, on the other hand, to the screen 2.1-2.N. The server 4 is also provided with a transceiver 12 connected, on the one hand, to this server 4 and, on the other hand, to the optical fiber.

The transceivers 12 and 15.1-15.N convert the electric signals, under the Ethernet standard, for example, into light signal and vice versa. These transceivers are bidirectional so as either to receive the signals from the optical fiber 9 to send them to the screens 2.1-2.N or the server 4, or to receive data from these screens 2.1-2.N or the server 4 to send same over the optical fiber 9.

When a switch is in an active position, such as the switches 14.1, 14.3 and 14.N shown, the information sent by the server 4 reaches the screen of a passenger via the transceivers 12, and 15.1-15.N. After re-amplification, the light signal starts off again on an optical fiber section to end at the next screen. The switch is in an active position when it is supplied with power.

On the other hand, if one of the switches is inactive, such as switch 14.2 shown, the switch is an inactive position, and the light signal passes directly to the next seat. This inactive position is the default position of the switch that can be observed when the optical switch is supplied with power.

More precisely, when the server 4 sends safety information intended to be displayed on the different screens, an electric signal 18 pertaining to this information is sent to the transceiver 12. This transceiver 12 converts the electric signal 18 into a light signal 19 which is sent to the optical switch 14.1 via an optical fiber section 9.1.

This switch 14.1, which is in an active position, deviates the signal 19 to the transceiver 15.1 which converts it into an electric signal 20. This electric signal 20 is then sent to the screen 2.1 which displays the safety data associated with this signal.

The signal 20 is also sent to the transceiver 16.1 which converts it into a light signal 21 whose contents are identical to the signal 19. This signal 21 was amplified by the transceiver 16.1 so as to compensate for the attenuation brought about by the optical fiber on the section 9.1 and by the switch 14.1.

This signal 21 is then sent to the optical switch 14.1 which deviates it to the optical switch 14.2 positioned downstream in relation to the switch 14.1 via an optical fiber section 9.2.

This optical switch 14.2, which is in an inactive position (because it is no longer supplied with power because of a malfunction), does not deviate the light signal 21 to the screen 2.2. The signal 21 is then sent directly to the switch 14.3 via the optical fiber section 9.3.

This switch 14.3 then sends this signal 21 to the screen 2.3 and re-sends an optical signal 22 amplified in relation to the signal 21. The signal 22 is then sent to the switch 14.N via the section of fiber 9.N. This switch 14.N, also in an active position, sends the signal 22 to the screen 2.N and re-amplifies it, and so on.

The information signal sent by the server 4 can thus be sent to all the screens 2.1, 2.3, 2.N associated with an optical switch in good running condition, even if some switches of the network, such as the switch 14.2, are not operating correctly.

Figure 4A:
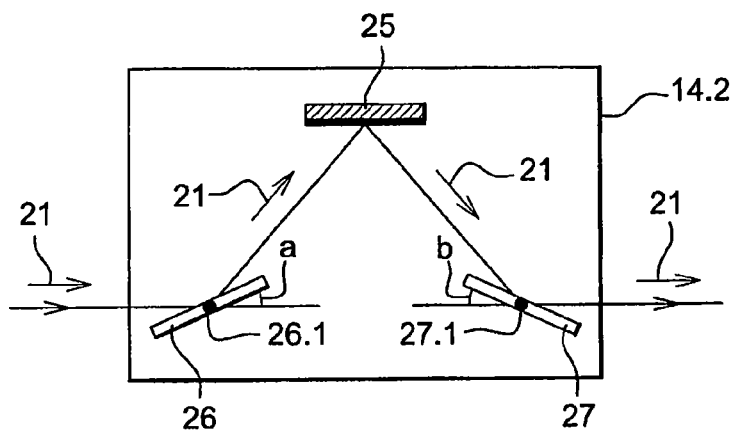
FIGS. 4a, 4b show schematic representations of the optical switches according to the present invention in their operating positions.
Figure 4B:
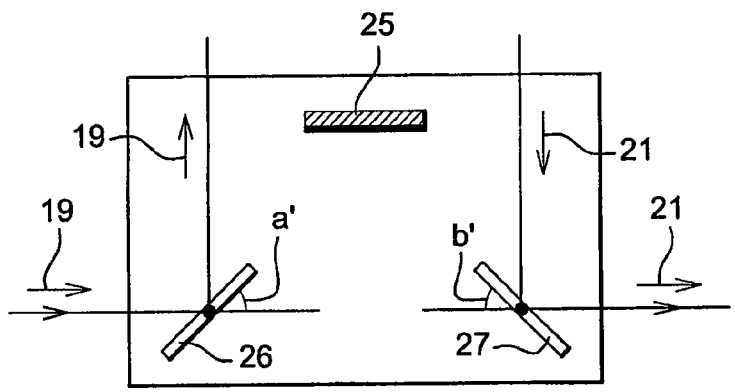

As shown in FIGS. 4a and 4b, each optical switch 14.1-14.N comprises a fixed mirror 25, as well as a first 26 and a second 27 mobile mirror, rotating, respectively, about an axis 26.1 and 27.1 perpendicular to the plane of the sheet. The fixed mirror 25 is positioned between the mobile mirrors 26, 27.

In the inactive position shown in FIG. 4a (which is that of the switch 14.2), the first mobile mirror 26 has an angle a such that it reflects the light signal 21 sent from the fiber to the fixed mirror 25. This fixed mirror 25 reflects the signal sent from the mobile mirror to the second mobile mirror 27. This second mobile mirror 27 has an angle b such that it reflects the signal sent from the fixed mirror 25 to another switch.

In the active position shown in FIG. 4b (which is that of the switch 14.1, in particular), the first mirror 26 has an angle a' such that it reflects the light signal sent from the fiber to the screen, while the second mobile mirror 27 has an angle b' such that it reflects the signal 21 sent from the screen to another switch.

Figure 4C:
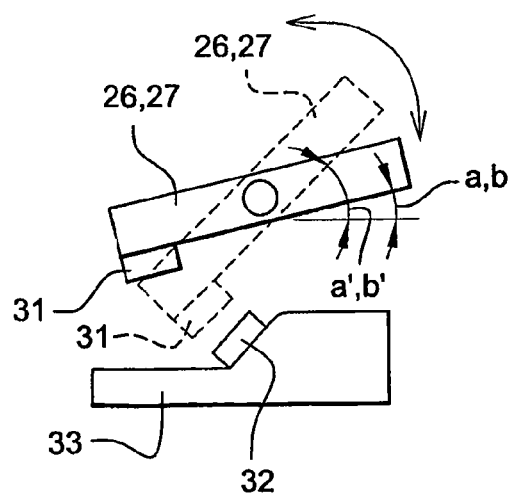
FIG. 4c shows a schematic representation of a micro-mirror and of the electrodes of the switch according to the present invention.

To ensure the passage from the inactive position to the active position, each mobile mirror 26, 27 comprises a first 31 and a second 32 control electrode, as shown FIG. 4c. The first electrode 31 is positioned on an end of the mobile mirror 26, 27 and the second electrode 32 is positioned on a fixed part 33 of the switch.

When the electrodes 31, 32 are not supplied with power, the two electrodes are spaced apart from each other by a mechanical force applied by a spring, for example, positioned in the rotating shaft, such that the mirrors 26, 27 form an angle a and b, respectively, with the horizontal. The switch is then in the inactive position (position in solid line).

When the electrodes 31, 32 are supplied with power, they attract one another, such that the mirrors 26, 27 turn and approach the support 33. The mirrors 26, 27 then form the angles a' and b', respectively, with the horizontal. This switch is then in the active position (position in dotted line).

As soon as the electrodes 31, 32 are no longer supplied with power, the mechanical force pushes the mirrors away from the support, such that the switch returns, of course, into the inactive position.

As a variant, the mirrors 26, 27 pass from an inactive position to an active position by means of a repulsive force.

As a variant, the rotation of the mirrors 26, 27 is controlled by means of motors.

As a variant, supplying the electrodes with power generates a twisting of the mirrors 26, 27 mounted on a flexible material.

Figure 5:
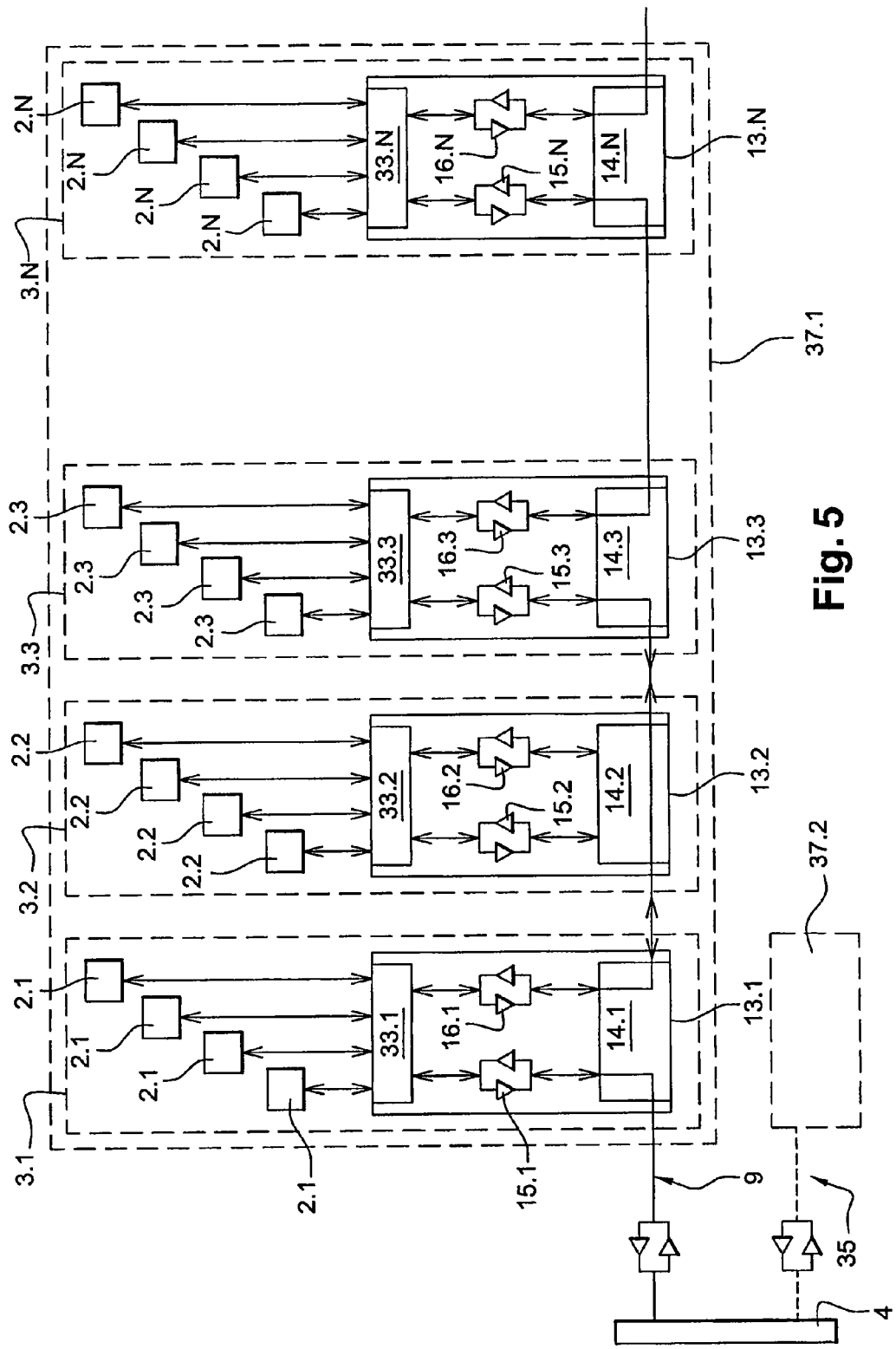
FIG. 5 shows a schematic representation of a variant of the optical fiber network according to the present invention.

FIG. 5 shows a variant of the present invention in which each seat 3.1-3.N comprises a plurality of seats and therefore a plurality of screens 2.1-2.N. In other words, in this case, the onboard network does not serve only one seat, but a row of two, three or four seats as shown.

Consequently, compared to FIG. 3, an Ethernet type network switch 33.1-33.N, or switch, is added at each node, so as to direct the signals sent from the network to all the screens 2.1-2.N of a same row of seats.

For this purpose, each switch 33.1-33.N is connected, on the one hand, to the transceivers 15.1 and 16.1 of a box and, on the other hand, to the screens 2.1-2.N of a row of seats.

In this configuration, it is assumed that a row of four seats may be deprived of entertainment programs insofar as the failure does not spread to all passengers. As for the safety instructions, they remain inaccessible to failing devices, but in a highly localized manner. The navigating personnel can then direct the passengers to the light panels arranged in the central aisle.

As a variant, the number of optical fibers is multiplied such that it is possible to connect two sets of seats 37.1 and 37.2 (or more) to the server 4 via distinct optical fibers 9 and 35. The seats of the set 37.2 (not shown) are connected to each other and to the server 4 in the same manner as the seats 3.1-3.N of the set 37.1 already described.

FIG. 6 show an optical switch 14.1 connected to its power supply 38 via a circuit breaker 39, such as a transistor operating under the standard conditions of all or nothing or any other equivalent switching device.

Figure 6A:
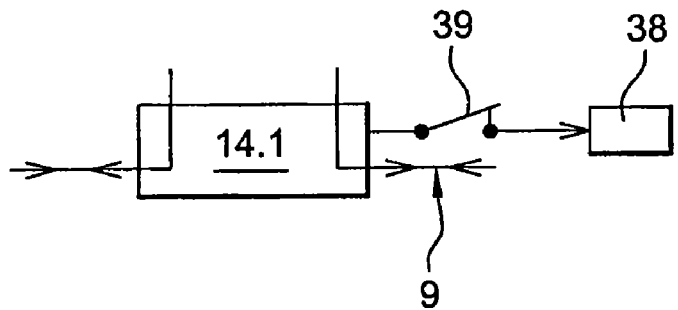
FIGS. 6a-6b show schematic representations of a switching device connecting the optical switch to its power supply in a closed and open state, respectively.
Figure 6B:
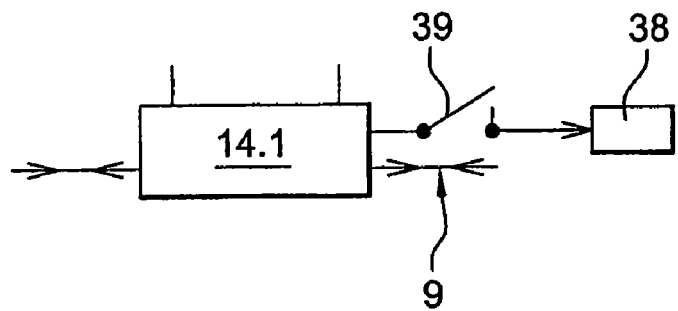

When the circuit breaker 39 is closed, as shown in FIG. 6a, the optical switch 14.1 is supplied with power such that it is active and ensures the sending of data to the network switch 33.1 with which it is associated, while, when the circuit breaker 39 is open as shown in FIG. 6b, the optical switch 14.1 is not supplied with power such that it is inactive and sends the signals received from the network directly to the next optical switch 14.2, without sending them to the network switch 33.1 with which it is associated in order to isolate the screens 2.1 that are connected to it.

Figure 7:
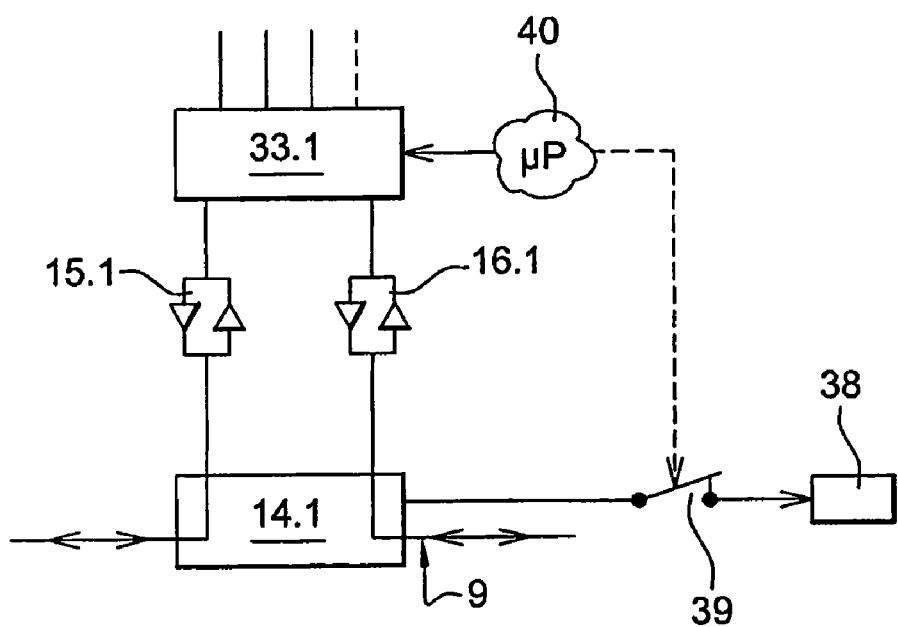
FIG. 7 shows a schematic representation of a network architecture comprising modules for monitoring the network ensuring control of the optical switches.

Moreover, as shown in FIG. 7, a monitoring module 40.1 controlling the opening and the closing of the circuit breaker 39 is associated with each network switch 33.1-33.N, this monitoring module 40.1 having the function of monitoring the coherence of data passing over the network. This monitoring module 40.1 may, for example, take the form of a microcontroller.

For this purpose, as soon as the monitoring module 40.1 detects that a tolerable error threshold (parameterizable) is reached (in other words, as soon as it detects a malfunction of the network), the said monitoring module 40.1 controls the opening of the circuit breaker 39 so as the put the switch 14 in the inactive position.

On the other hand, when the tolerable error threshold is not reached (in other words, when the network functions correctly), the said control module 40.1 controls the closing of the circuit breaker 39 so as to put the switch 14 in the active position.

The parameters monitored by the monitoring module 40.1 may, for example, be the number of acknowledgment signals sent by each of the screens 2.1-2.N (this parameter makes it possible to measure the congestion of the network), or the number of frames sent by each of the screens 2.1-2.N which are substituted with high-priority frames. The thresholds associated with these different parameters may be different and are parameterizable.

The invention claimed is:

1. Switched optical fiber network for airplane seats, this network comprising screens connected to each other via an optical fiber, a light signal circulating in this optical fiber to these screens, this network additionally comprising an upstream switching box and a downstream switching box connected in series on the optical fiber to each other, the upstream switching box being positioned upstream of the downstream switching box, at least one screen being connected to each switching box, at least the upstream switching box comprising an optical switch comprising at least one mobile mirror configured to orient the light signal (a) in a first direction when the optical switch is not supplied with power, the first direction sending the light signal unamplified to the downstream switching box, and (b) in a second direction only when the optical switch is supplied with power and thus live, the second direction sending the light signal to the screen connected to the upstream switching box, and means for amplifying the light signal and sending it to the downstream switching box when the upstream switching box is live.

2. Network in accordance with claim 1, wherein the optical switch of the upstream switching box comprises a fixed mirror and two mobile mirrors rotating about an axis, these mirrors being positioned in such a way that they reflect the light signal to the downstream switching box when the switch is not supplied with power and thus not live, and the mirrors being positioned in such a way that the light signal is reflected to the screen and to the downstream switching box when the optical switch is live.

3. Network in accordance with claim 1, wherein the mobile mirror of the optical switch comprises a first and a second control electrode,
the first electrode being positioned on an end of the mobile mirror and the second electrode being positioned on a fixed part of the optical switch,
the optical switch being in the inactive position when the first and second electrodes are not activated,
the optical switch being in the active position when the first and second electrodes are activated.

4. Network in accordance with claim 1, wherein the upstream switching box additionally comprises:
a transceiver positioned between the screen and the optical switch of the upstream box,
the transceiver ensuring (a) the conversion of the light signal sent over the optical fiber into an electric signal sent to the screen and vice versa, as well as
(b) amplification of the light signal sent to the downstream switching box.

5. Network in accordance with claim 1, further comprising:
an Ethernet type network switch connected between the optical switch of a switching box and the screen to which it is connected, with other screens being connected to this network switch.

6. Network in accordance with claim 5, wherein each optical switch is connected to its power supply via a switching device, and wherein the network comprises a monitoring module associated with each network switch controlling a switching device, each monitoring module controlling the opening of the switching device corresponding to it in case a problem is detected on the network.

7. Network in accordance with claim 1, further comprising a server connected to the screens via the optical fiber, the server sending data to the screens of the network.

8. Network in accordance with claim 1, wherein the optical fiber is bidirectional.

9. Optical fiber network for airplane seats, comprising:
switching boxes connected to each other in series via an optical fiber inside of which passes a light signal,
each switching box including a switch comprising at least one mobile mirror and connected, on the one hand, to at least one screen of a seat and, on the other hand, to a first and to a second transceiver capable of converting an electric signal into an optical signal and vice versa, the first and the second transceivers also being connected to the optical network,
wherein, only when the light signal in the optical fiber arrives at a switching box whose switch is supplied with power, this light signal is converted into an electric signal by the first transceiver, the electric signal coming from this conversion being delivered to the screen and to the second transceiver via the switch, this other transceiver converting the electric signal received into a further optical signal which further optical signal is delivered to another switching box on the optical network, and when the light signal in the optical fiber arrives at a switching box whose switch is not supplied with power, this light signal is not converted into an electric signal and not delivered to the screen but is delivered to another switching box on the optical network.

10. Network in accordance with claim 9, wherein the switch is an Ethernet switch connected, on the one hand, to four screens of a seat and, on the other hand, to the first and to the second transceivers.

* * * * *